T. E. MURRAY & G. K. JESSUP.
SEAL FASTENING.
APPLICATION FILED MAR. 28, 1914.

1,139,052.

Patented May 11, 1915.

Witnesses:
May J. McGarry.
Pauline M. Abel.

Inventors
Thomas E. Murray
George K. Jessup
By their Attorney
Park Benjamin

THE NORRIS PETERS CO., PHOTO-LITHO., WASHINGTON, D. C.

UNITED STATES PATENT OFFICE.

THOMAS E. MURRAY AND GEORGE K. JESSUP, OF NEW YORK, N. Y.; SAID JESSUP ASSIGNOR TO SAID MURRAY.

SEAL-FASTENING.

1,139,052.        Specification of Letters Patent.        Patented May 11, 1915.

Application filed March 28, 1914. Serial No. 827,853.

*To all whom it may concern:*

Be it known that we, THOMAS E. MURRAY and GEORGE K. JESSUP, citizens of the United States, residing at New York, in the county of New York and State of New York, have invented a certain new and useful Improvement in Seal-Fastenings, of which the following is a specification.

The invention is a seal fastening which after engagement cannot be opened without mutilation.

The device comprises a closed shell of metal, in which is transversely disposed a wire of steel, or other hard and resilient material. The shackle arms are formed of softer wire, and are introduced into the shell through the openings therein, so as to enter between the said hard wire and the longitudinal edge walls of said shell. Any effort to withdraw the arms causes the ends of the steel wire to compress said arms against the shell and to indent said arms and thus to engage said arms and prevent their further outward movement.

Figure 1:
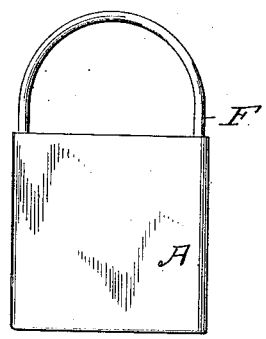
Figure 3:
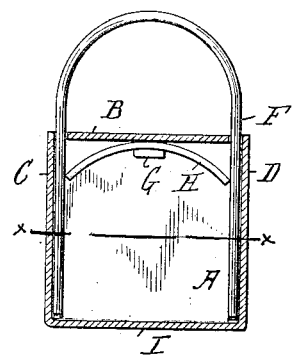
Figure 4:
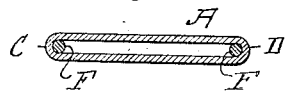
Figure 2:
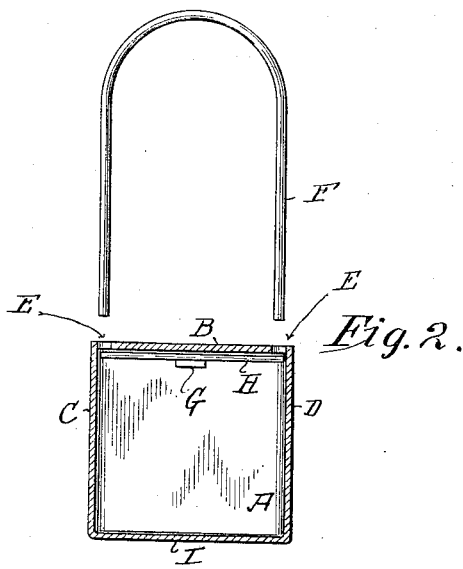

In the accompanying drawings—Figure 1 is a side elevation of our seal fastening. Fig. 2 shows the shackle and shell separated, and the shell in section. Fig. 3 is a sectional view showing the shackle engaged in the shell. Fig. 4 is a section on line $x$, $x$ of Fig. 3.

Similar letters of reference indicate like parts.

The shell A is formed of sheet metal and, as shown in the drawings, is made flat, with its longitudinal edge walls C, D bent so as to be internally concave. In one transverse edge wall B and in proximity to the edge walls C, D are two openings E, into which the arms of the shackle F enter, with a snug fit the said arms also fitting in the concavities of said edge walls C, D. Within the shell, between and preferably equidistant from the openings E and in proximity to the edge wall B, is a fixed support G. Interposed between said support and resting thereon, preferably at its middle portion, is a wire H of steel, or other hard resilient material. The ends of said wire extend in front of the openings E. The arms of shackle F are to be made of wire softer than the material of strip H, and have a substantially smooth surface—that is, normally without indentations or recesses.

In operation, the shackle arms are inserted in the openings E and pushed into the shell between edge walls C, D and the ends of wire H, thus bending inwardly said ends, as shown in Fig. 3, and until the extremities of said arms reach the edge wall I of the shell. Any attempt to remove the shackle causes the wire H to straighten, and in so doing, to cause its extremities to compress said arms in the concavities of walls C, D and to indent and so seat themselves in the softer material of the shackle arms. In this way, the shackle becomes locked in the shell, and cannot be removed without mutilation of the device.

We claim:

1. A seal fastening, comprising a shackle having a substantially smooth surface, a closed shell having two openings receiving the arms of said shackle, a resilient member within said shell of material harder than the material of said shackle arms and contacting at its ends with said arms: the said member being adapted to compress said arms against said shell and to engage said arms upon attempted withdrawal of said shackle from said shell.

2. A seal fastening, comprising a wire shackle having a substantially smooth surface, a closed shell having side walls and edge walls and having openings in one of said edge walls receiving the arms of said shackle, a support within said shell in proximity to the edge wall containing said openings and disposed between said openings, and a strip of resilient metal harder than said shackle extending in front of said openings and between said support and said edge wall: the said shackle arms being adapted when in place in the shell to meet the edge wall opposite to that containing said openings, and the said metal strip being adapted to compress said arms against said shell upon attempted withdrawal of said shackle from said shell.

In testimony whereof we have affixed our signatures in presence of two witnesses.

THOMAS E. MURRAY.
GEORGE K. JESSUP.

Witnesses:
GERTRUDE T. PORTER,
MAY T. MCGARRY.

Copies of this patent may be obtained for five cents each, by addressing the "Commissioner of Patents, Washington, D. C."